Patented Oct. 7, 1941

2,258,243

UNITED STATES PATENT OFFICE 2,258,243

VINYL RESIN COATING AND PROCESS PRODUCING SAME

Arthur K. Doolittle, South Charleston, W. Va., assignor to Carbide and Carbon Chemicals Corporation, a corporation of New York No Drawing. Original application December 12, 1936, Serial No. 115,531. Divided and this application March 24, 1938, Serial No. 197,780

5 Claims. (Cl. 91—70)

The invention relates to improvements in vinyl resin coating compositions, including a manner of producing such coatings with improved adherence and stability characteristics. It is particularly concerned with providing strongly adherent and resistant coatings and finishes on metal surfaces of iron, tin and zinc.

The vinyl resins with which the invention is concerned are those which may be prepared by the conjoint polymerization of vinyl halides, such as vinyl chloride, with vinyl esters of the lower aliphatic acids, such as vinyl acetate, propionate, butyrate, and formate. Preferred resins of this type may be prepared from vinyl chloride and vinyl acetate in reaction proportions of about 60 to 95 parts by weight of vinyl chloride to from about 40 to 5 parts of the acetate. The preparation of the resins forms no part of the present invention, and they are similar to those shown and described in Patent No. 1,935,577, issued to E. W. Reid on November 14, 1933. Within the broad class of such resins, those containing in the polymer from about 80 to 90 parts by weight of the vinyl chloride are particularly suitable for the purpose of this invention.

While the inherent quality of these vinyl resins, especially their physical and chemical resistance, makes them excellently suited for surface coating purposes, their strong adhesion to metals and similar smooth surfaces has only been obtained with certain difficulties. It has previously been found, for example, that adequate adhesion to metal surfaces can, in most instances, only be provided by suitable baking of the applied coating, and that the best making temperatures are above those at which the vinyl resin will normally begin to decompose without suitable precautions to prevent such action. To prevent or retard this decomposition, it has been considered necessary to incorporate with the resin certain heat stabilizing materials which will permit proper baking without sufficient decomposition to adversely affect the adhesive and resistant qualities of the finish. While stabilizers heretofore proposed have been operative under many conditions, and within certain limits, they have not shown a completely satisfactory protective function in coatings applied to surfaces of iron, tin-plate and zinc.

The present invention is also directly concerned with the heat stabilization of these vinyl resin coating compositions, and the principal object thereof is to provide a more efficacious means and method of insuring thermal stability, with accompanying strong adherence and resistance, of vinyl resin coatings and finishes baked on iron, tin-plate and zinc metal surfaces.

The novelty in the invention is based primarily upon further discoveries which have been made concerning the nature of, and the conditions affecting, thermal decomposition of vinyl resins. I have found, for example, that in the presence of, and in contact with, metals such as iron, tin-plate and zinc, the tendency toward decomposition of coatings containing these resins is more pronounced than on surfaces of other materials, and it appears that such metals, or their reactive compounds promote or catalyze decomposition on baking. At the same time, it has further been determined that massive forms or thick films of vinyl resin compositions are noticeably more susceptible to thermal decomposition than relatively thin films of the type suitable for use in protective coatings, and deterioration through reaction within the resin mass appears to result at elevated temperatures regardless of the nature of the surface with which it is in contact.

It is therefore proposed by this invention to incorporate in coating compositions, containing vinyl resins as the essential film-forming ingredient, stabilizing materials adapted essentially and primarily to protect the applied coating from deterioration through the catalyzing effect of iron, tin-plate, zinc, alloys containing substantial proportions of these metals, and other metal-surfaces which similarly promote thermal decomposition. In producing a protective coating, decomposition through other causes is then substantially eliminated by exercising close control of the applied film thickness, which should not be greater than 0.01 inch, and preferably in the neighborhood of 0.005 inch.

Stabilizers suitable for this purpose include materials capable of preventing the acid decomposition products formed, when the resin coating is heated to 275, F., or higher, from contacting or reacting with the metal surface, including, for example, substances which are more reactive chemically with the acid decomposition products than the harmful metals or their salt compounds. Certain metals will exhibit this function and have been found especially appropriate, small quantities of which will, when thoroughly dispersed throughout the resin composition, readily take up and react with the acid decomposition products. The reaction products of these metals have, of course, no harmful effect in promoting the thermal decomposition of the resin. Representative of these are metals such as calcium and sodium, which may be incorporated in the resin in very finely divided pure form, or added thereto as reactive compounds of the metals, particularly their organic derivatives. By way of example, about ten parts of fine calcium powder was thoroughly dispersed in about 90 parts of vinyl resin by grinding the mixture on a differential two-roll mill. The resin was one formed by the conjoint polymerization of vinyl chloride and vinyl acetate, and containing in the polymer approximately 87% by weight of vinyl chloride. The milled mixture was then dissolved in appropriate solvents, and applied to a steel panel. Baking of the coated panel for one hour at 350° F. showed no discoloring or decomposition whatever in the film, and a strongly adherent and highly resistant protective coating was produced. Similar tests on other surfaces of black iron, tin-plate and zinc, showed that decomposition of the film coat was effectively prevented at all baking schedules essential for proper film adherence, including temperatures as high as 375° F. over a period of one hour.

It is preferred in applying the coating to maintain a film thickness not greater than 0.01 inch and preferably around 0.005 inch. This will avoid any resin decomposition which is normally encountered purely within the resin mass when heated in forms of larger dimensions. The actual proportion of stabilizer necessary to effect the best results will vary with the nature of the particular lacquer formula desired, as well as with the temperature and time of baking and other conditions. Normally a range of 5% to 15% by weight of the vinyl resin is suitable, with complete and thorough dispersion of the stabilizing material.

It will be understood that a variety of solvents, plasticizers, coloring materials and modifying agents may be present in lacquer formulas employing these stabilizers. The compositions of the invention are especially useful as priming coats, although they are not limited to this application, and the film stability is still maintained, for example, when applied over undercoats containing pigments composed of iron or zinc metal compounds.

Modifications other than as disclosed will be apparent to those skilled in the art, and are intended to be included within the scope of this invention as defined in the appended claims. This application is a division of my application Serial No. 115,531, filed December 12, 1936, now Patent No. 2,160,061, granted May 30, 1939.

I claim:

1. A vinyl resin composition for coating metal surfaces of iron, tin-plate and zinc, comprising as the essential film-forming ingredient a resin substantially identical with that formed by the conjoint polymerization of a vinyl halide and a vinyl ester of an aliphatic acid, together with a stabilizer material comprising a member of the group consisting of finely-divided sodium and calcium metals.

2. A vinyl resin composition for coating metals of iron, tin-plate and zinc, comprising as the essential film-forming ingredient a resin substantially identical with that formed from the conjoint polymerization of vinyl chloride and vinyl acetate, together with an intimately dispersed member of the group consisting of finely divided sodium and calcium metals.

3. A vinyl resin composition for coating metals of iron, tin-plate and zinc, comprising as the essential film-forming ingredient a resin substantially identical with that formed from the conjoint polymerization of vinyl chloride and vinyl acetate, and containing about 80% to 90% of vinyl chloride in the polymer, together with about 5% to about 15% of finely-divided calcium metal intimately dispersed throughout said coating composition.

4. Process for producing strongly adherent and resistant surface coatings on metals of iron, tin-plate and zinc, which comprises forming on said metal surface in a relatively thin film thickness a coating containing as the essential film-forming ingredient a vinyl resin substantially identical with that formed by the conjoint polymerization of a vinyl halide and a vinyl ester of an aliphatic acid, said vinyl resin having intimately incorporated therewith a stabilizer material comprising a member of the group consisting of finely-divided sodium and calcium metals.

5. Process for producing strongly adherent and resistant surface coatings on metals of iron, tin-plate and zinc, which comprises forming on said metal surface in a film thickness of about 0.005 inch a coating containing as the essential film-forming ingredient a vinyl resin substantially identical with that formed by the conjoint polymerization of vinyl chloride and vinyl acetate, and containing about 80% to 90% vinyl chloride in the polymer, said vinyl resin having intimately incorporated therewith about 5% to about 15% of finely-divided calcium metal, and subsequently baking said coating at a temperature above 300° F.

ARTHUR K. DOOLITTLE.